United States Patent
Roquemore, III

(10) Patent No.: US 7,071,815 B1
(45) Date of Patent: Jul. 4, 2006

(54) RADIO FREQUENCY IDENTIFICATION SYSTEM WITH SEPARATELY LOCATED TRANSMITTERS AND RECEIVERS

(75) Inventor: John Peter Roquemore, III, Snellville, GA (US)

(73) Assignee: NCR Corporation, Dayton, OH (US)

( * ) Notice: Subject to any disclaimer, the term of this patent is extended or adjusted under 35 U.S.C. 154(b) by 298 days.

(21) Appl. No.: 10/659,660

(22) Filed: Sep. 10, 2003

(51) Int. Cl.
*H04Q 5/22* (2006.01)
*G08B 5/22* (2006.01)
*G08C 19/00* (2006.01)
*G06Q 30/00* (2006.01)

(52) U.S. Cl. ................. 340/10.1; 340/825.49; 340/825.72; 340/825.73; 705/26

(58) Field of Classification Search ............... 340/10.1, 340/825.49, 825.72, 825.73, 825.35; 705/26
See application file for complete search history.

(56) References Cited

U.S. PATENT DOCUMENTS

| 4,816,824 A | 3/1989 | Katz et al. .............. 340/825.34 |
| 5,151,684 A | 9/1992 | Johnsen ....................... 340/572 |
| 5,239,167 A | 8/1993 | Kipp ........................... 235/383 |
| 6,019,394 A | 2/2000 | Chenoweth et al. ........... 283/81 |
| 6,046,682 A * | 4/2000 | Zimmerman et al. .. 340/825.49 |
| 6,419,154 B1 * | 7/2002 | Dalton et al. ................ 235/383 |
| 6,601,764 B1 * | 8/2003 | Goodwin, III .............. 235/385 |
| 6,626,359 B1 * | 9/2003 | Haulk et al. ................. 235/385 |
| 6,747,560 B1 * | 6/2004 | Stevens, III ................ 235/383 |

* cited by examiner

*Primary Examiner*—Michael Horabik
*Assistant Examiner*—Scott Au
(74) *Attorney, Agent, or Firm*—Paul W. Martin; Maginot, Moore & Beck LLP

(57) ABSTRACT

A radio frequency identification (RFID) system with separately located transmitters and receivers which lowers system cost. The system includes a plurality of transmitters for interrogating radio frequency identification tags attached to items on store shelves, a plurality of receivers separately located from the transmitters for receiving response information from the radio frequency identification tags.

11 Claims, 5 Drawing Sheets

RADIO FREQUENCY IDENTIFICATION SYSTEM WITH SEPARATELY LOCATED TRANSMITTERS AND RECEIVERS

BACKGROUND OF THE INVENTION

The present invention relates generally to retail transaction systems and, in particular, to a radio frequency identification (RFID) system with separately located transmitters and receivers.

RFID technology provides an alternative to bar code reader technology for distinguishing and recording items for purchase. RFID may result in labor savings to retailers, since it may obsolete conventional methods of identifying products.

Some of the uses of RFID technology are disclosed in U.S. Pat. No. 6,019,394 assigned to the assignee of the present invention. This patent is hereby incorporated by reference.

RFID tags may be permanently attached to products. RFID tags permanently attached to clothing and other items may be worn or carried by customers into stores. These RFID tags may be detected by RFID interrogators within the stores.

RFID systems that are currently being developed include an integrated unit containing uplink and downlink circuitry. The uplink and downlink circuitry sends a downlink transmission signal with sufficient energy to stimulate RFID tags, and receives an uplink signal containing responses from the tags.

Since the uplink signal is of significantly less energy than the downlink signal, the integrated unit must be placed close enough to the RFID tags to be able to receive the uplink signal. In a store with multiple intergrated units, placement of integrated units close enough to the RFID tags causes a redundancy in downlink signals and an excess of radio frequency (RF) energy.

It would be desirable to provide an RFID system with separately located transmitters and receivers.

SUMMARY OF THE INVENTION

In accordance with the teachings of the present invention, a radio frequency identification (RFID) system with separately located transmitters and receivers is provided.

The system includes a plurality of transmitters for interrogating radio frequency identification tags attached to items on store shelves, a plurality of receivers separately located from the transmitters for receiving response information from the radio frequency identification tags.

It is accordingly an object of the present invention to provide an RFID system with separately located transmitters and receivers.

It is another object of the present invention to reduce the number of transmitters in an RFID system.

It is another object of the present invention to provide an RFID system with separately located transmitters and receivers in which the receivers are located with electronic shelf labels.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
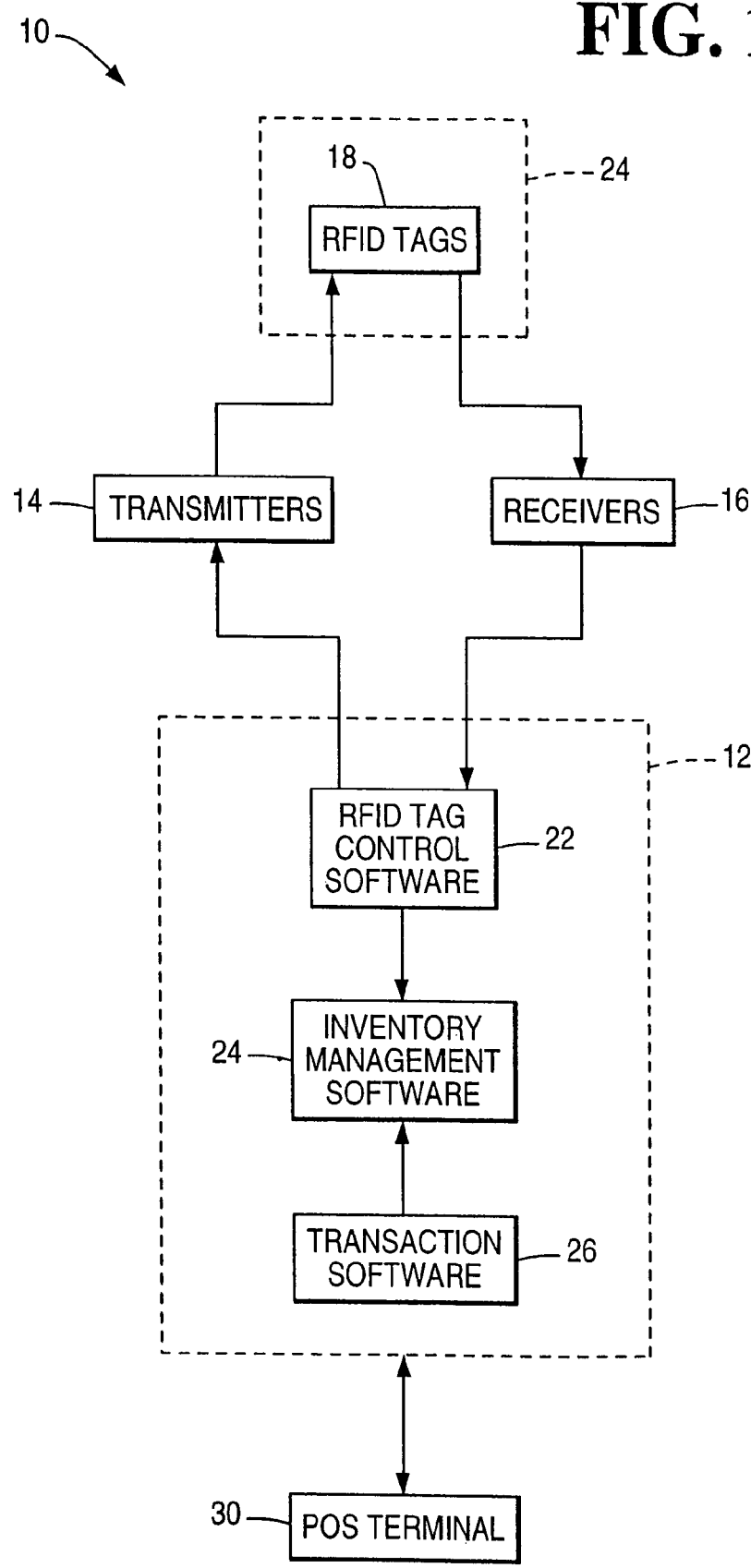
FIG. 1A is a block diagram of a first embodiment of a radio frequency identification (RFID) system.
Figure 1B:
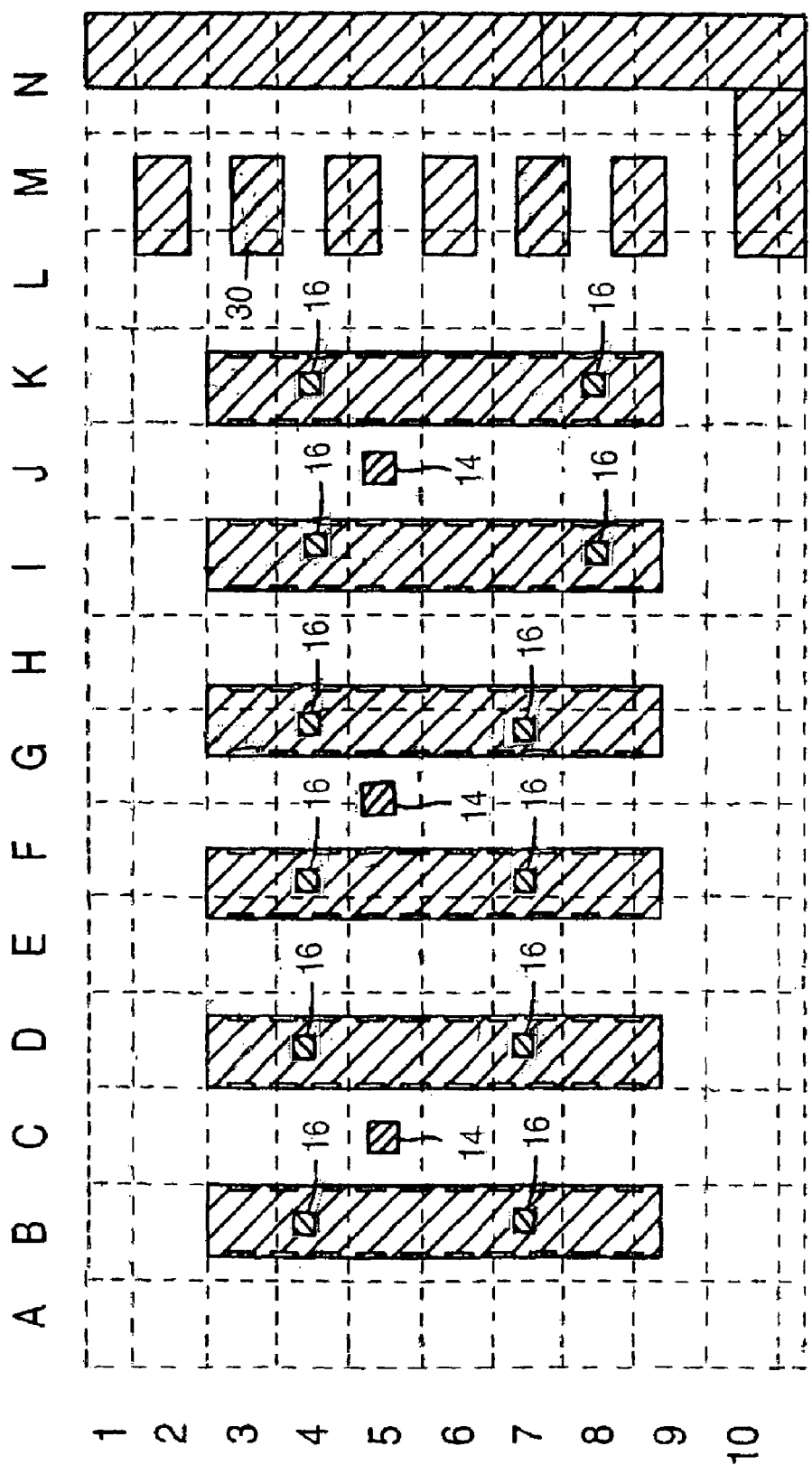
FIG. 1B is an example map of a transaction establishment incorporating the system of FIG. 1A.

Referring now to FIGS. 1A and 1B, transaction system 10 primarily includes server 12, transmitters 14, receivers 16, and radio frequency identification (RFID) tags 18.

Server 12 executes RFID system control software 22 which controls transmitters 14 and receivers 16. RFID system control software 22 causes transmitters 14 to transmit signals for interrogating RFID tags 18. RFID system control software 22 receives response information from receivers 16.

Server 12 may be a back office serve that also executes other applications, such as transaction software 24 and inventory management software 26.

Transaction software 24 provides price information to point of sale (POS) terminal 30.

Inventory management software 24 monitors shelf inventory levels using the response information from receivers 16 and product sales information from POS terminal 30, and may automatically reorder products when inventory thresholds are reached.

Transmitters 14 transmit signals for interrogating RFID tags 18. Transmitters 14 are preferably mounted to a ceiling, in rows between shelves for optimal interrogation.

Receivers 16 receive response information from RFID tags 18. Receivers 16 are preferably mounted to the ceiling, in rows above corresponding shelves.

Transmitters 14 and receivers 16 and separately located. The number of transmitters 14 required to cover a store is generally smaller than the number of receivers 16, since receivers 16 must be closer to items 20. The number of transmitters 14 may be as little as half the number of receivers 16.

RFID tags 18 store information, such as a unique identification code. RFID tags 18 radiate a signal containing the unique identification code using energy received from the signal from transmitter 14.

Figure 2A:
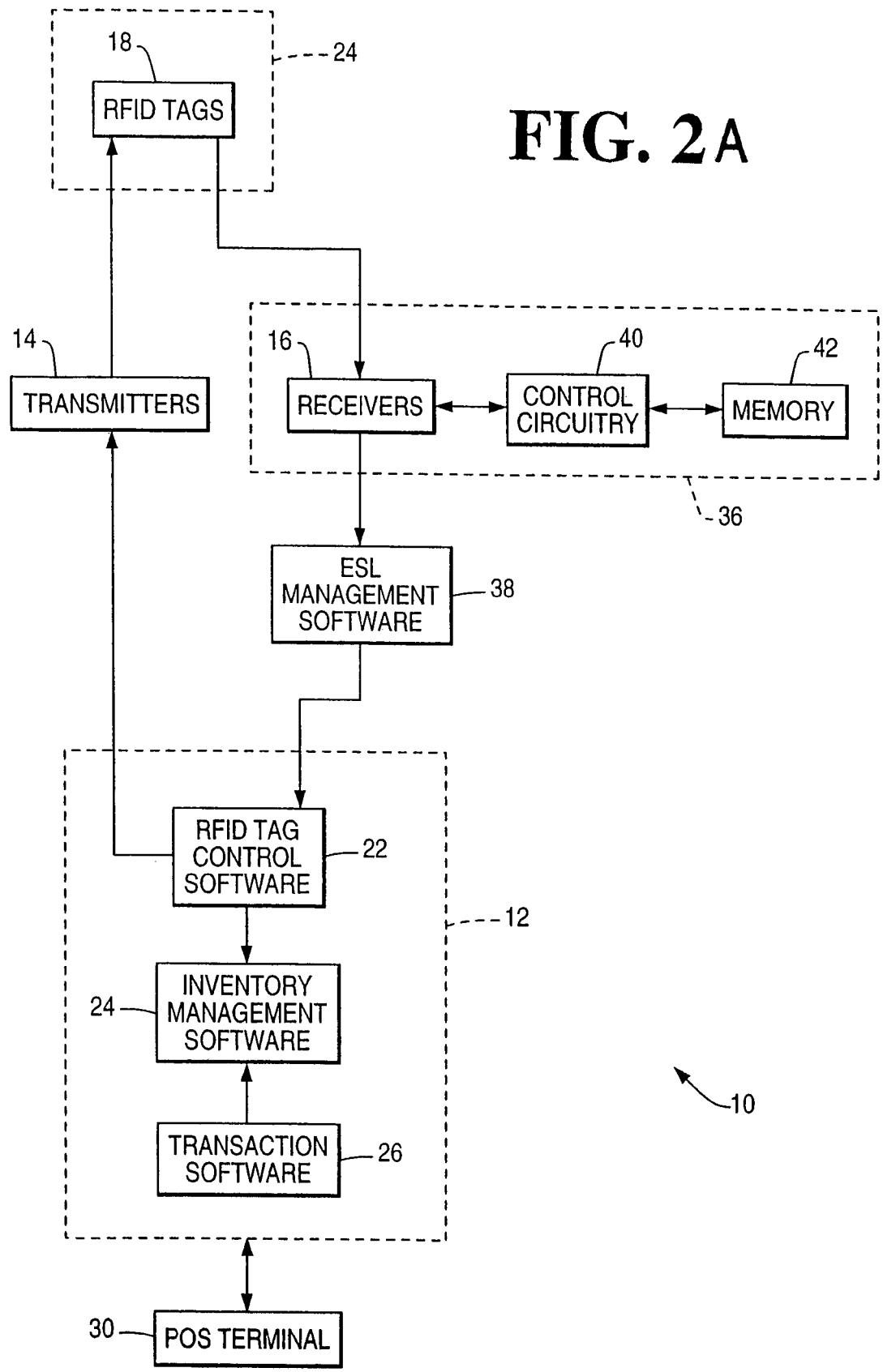
FIG. 2A is a block diagram of a second embodiment of an RFID system.
Figure 2B:
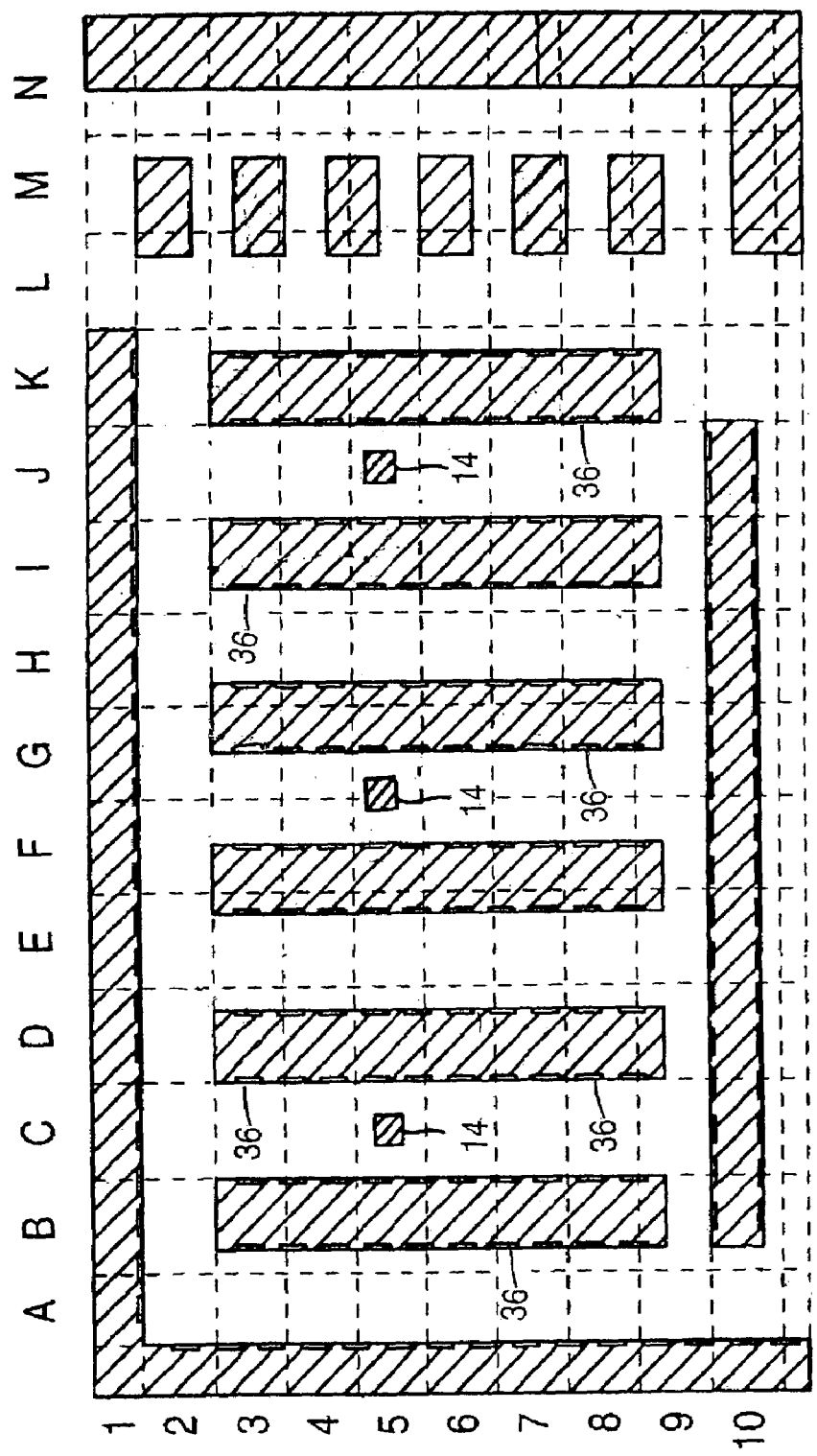
FIG. 2B is an example map of a transaction establishment incorporating the system of FIG. 2A.

Referring now to FIGS. 2A and 2B, a second embodiment is similar to the first embodiment in FIG. 1A, except that receivers 16 are located within electronic shelf labels (ESLs) 36.

Control circuitry 40 within receiver 16 stores response information from RFID tags 18 in memory 42.

RFID tag control software 22 obtains the response information through ESL management system 38. RFID tag control software 22 causes ESL management system 38 to send message to ESLs 36 requesting response information stored within memories 42. Control circuitry 40 receives the message and complies with instructions in the message to obtain the response information from memory 42 and send it to ESL management system 38.

Control circuitry 40 also controls display of price and promotion information by ESL 36. Communication between ESL 36 and ESL management system 38 may be wired or wireless communication.

Figure 3:
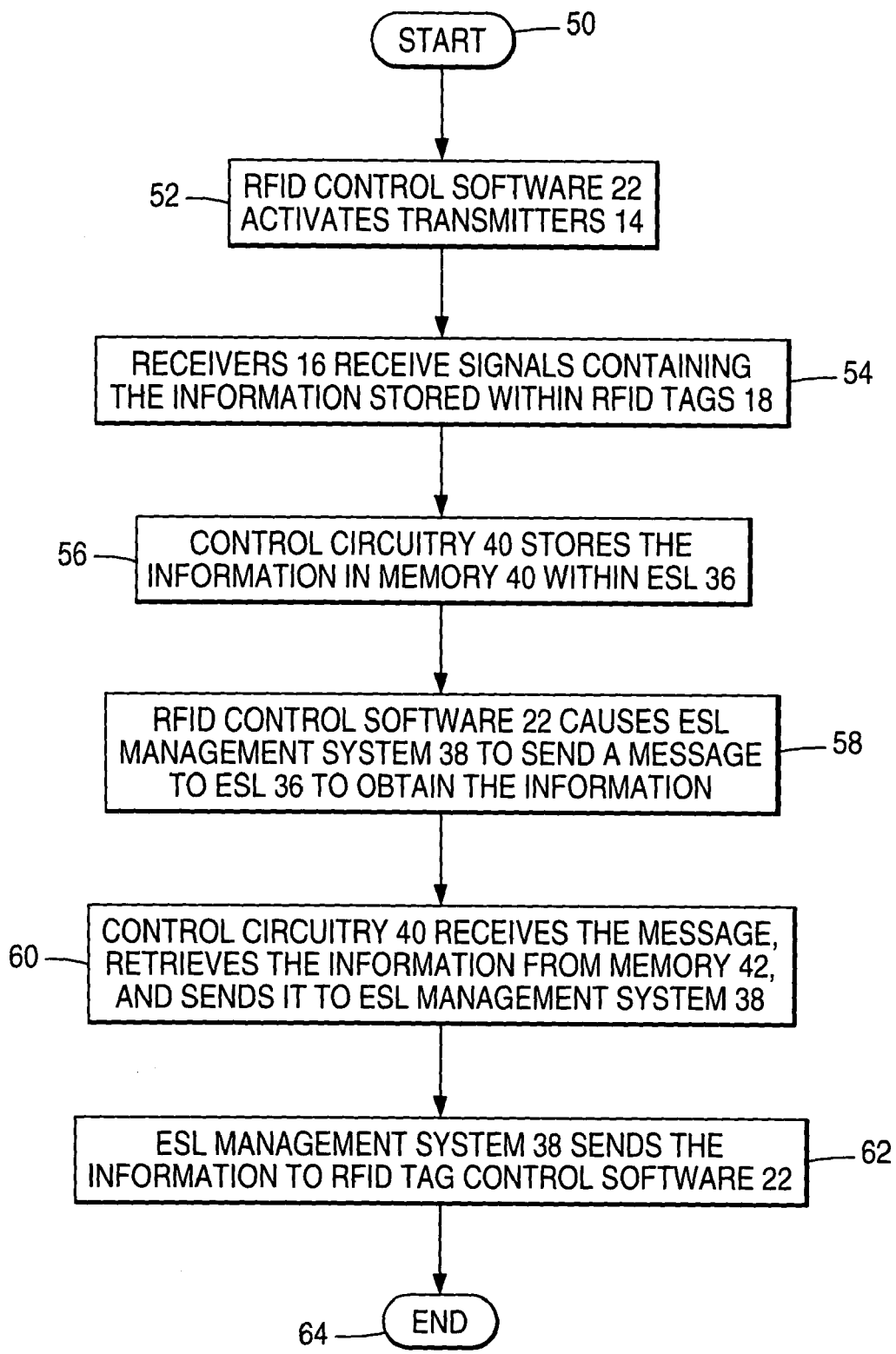
FIG. 3 is a flow diagram illustrating a method of capturing information during a check transaction.

FIG. 3 is a flow diagram illustrating a method of capturing information from RFID tags 18 in a system 10 of FIGS. 2A and 2B beginning with Start 50.

In step 52, RFID tag control software 22 activates transmitters 14. The signal from transmitters 14 stimulate RFID tags 18 to respond with information stored inside.

In step 54, receivers 16 receive signals containing the information stored within RFID tags 18.

In step 56, control circuitry 40 stores the information in memory 40 within ESL 36.

In step 58, RFID tag control software 22 causes ESL management system 38 to send a message to ESL 36 to obtain the information.

In step 60, control circuitry 40 receives the message, retrieves the information from memory 42, and sends it to ESL management system 38.

In step 62, ESL management system 38 sends the information to RFID tag control software 22.

In step 64, operation ends.

Advantageously, overall cost of system 10 is lower than a system with integrated transmitter 14 and receiver 16. Regulatory requirements may favor separation as well, since the overall amount of RF energy being transmitted may be lowered using fewer, more powerful transmitters 14 versus many less powerful integrated transmitters 14. The installation cost could be substantially impacted as a separate transmitter 14 may be powered separately by a alternating current (AC) source, while receiver 16 may be battery powered. Separation of power supplies facilitates system flexibility. Receivers 16 may be placed in various locations, regardless of the availability of external power. Separation of power supplies also facilitates incorporation into battery powered ESLs 38.

Although the invention has been described with particular reference to certain preferred embodiments thereof, variations and modifications of the present invention can be effected within the spirit and scope of the following claims.

What is claimed is:

1. A radio frequency identification system comprising:
   a plurality of transmitters for interrogating radio frequency identification tags attached to items on store shelves;
   a plurality of receivers for receiving response information from the radio frequency identification tags, wherein the receivers are separately located from the transmitters; and
   a computer for controlling the transmitters and receivers.

2. The system of claim 1, wherein the transmitters number less than the receivers.

3. The system of claim 1, wherein the transmitters number as low as about half of the receivers.

4. The system of claim 1, wherein the receivers are closer to the items than the transmitters.

5. The system of claim 1, wherein the transmitters are mounted to a ceiling in rows between the shelves.

6. The system of claim 1, wherein the receivers are mounted to a ceiling in rows above the shelves.

7. The system of claim 1, wherein the receivers are part of electronic shelf labels mounted on the shelves.

8. A radio frequency identification system comprising:
   a plurality of transmitters mounted to a ceiling between store shelves for interrogating radio frequency identification tags attached to items on the store shelves;
   a plurality of receivers separate from the transmitters and mounted to the ceiling above the shelves and closer to the items than the transmitters for receiving response information from the radio frequency identification tags;
   wherein the transmitters number as low as about half of the receivers; and
   a computer for controlling the transmitters and receivers.

9. A method of capturing information from radio frequency identification tags attached to items on the store shelves comprising the steps of:
   providing a plurality of transmitters for interrogating radio frequency identification tags attached to items on store shelves;
   providing a plurality of receivers separately located from the transmitters for receiving response information from the radio frequency identification tags;
   activating the plurality of transmitters; and
   receiving the information stored within the radio frequency identification tags from the receivers.

10. A method of capturing information from radio frequency identification tags attached to items on the store shelves comprising the steps of:
    providing a plurality of transmitters mounted to a ceiling between store shelves for interrogating the radio frequency identification tags;
    providing a plurality of receivers separate from the transmitters and mounted to the ceiling above the shelves and closer to the items than the transmitters for receiving response information from the radio frequency identification tags;
    activating the plurality of transmitters; and
    receiving signals containing the information stored within the radio frequency identification tags.

11. A method of capturing information from radio frequency identification tags attached to items on the store shelves comprising the steps of:
    providing a plurality of transmitters mounted to a ceiling between store shelves for interrogating the radio frequency identification tags;
    providing a plurality of electronic shelf labels adjacent the items and containing receivers for receiving response information from the radio frequency identification tags;
    activating the plurality of transmitters; and
    storing the information in memories within the electronic shelf labels; and
    retrieving the information from the memories.

* * * * *